United States Patent
Powers

(10) Patent No.: US 11,499,663 B2
(45) Date of Patent: *Nov. 15, 2022

(54) WATER MAIN TAPPING DEVICES AND METHODS

(71) Applicant: PowerSeal Pipeline Products Corporation, Wichita Falls, TX (US)

(72) Inventor: Patrick Powers, Wichita Falls, TX (US)

(73) Assignee: PowerSeal Pipeline Products, Wichita Falls, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/489,990

(22) Filed: Sep. 30, 2021

(65) Prior Publication Data

US 2022/0018477 A1    Jan. 20, 2022

Related U.S. Application Data

(63) Continuation of application No. 15/624,480, filed on Jun. 15, 2017, now Pat. No. 11,162,625.

(51) Int. Cl.
*F16L 55/18*    (2006.01)
*F16L 41/06*    (2006.01)

(52) U.S. Cl.
CPC .................... *F16L 41/06* (2013.01)

(58) Field of Classification Search
CPC ..... F16L 41/06; F16K 27/067; Y10T 137/612
See application file for complete search history.

(56) References Cited

U.S. PATENT DOCUMENTS

| 2,983,477 | A | 5/1961 | Merrill |
| 3,821,965 | A | 7/1974 | Reynolds |
| 4,240,459 | A | 12/1980 | Trautwein |
| 4,638,834 | A | 1/1987 | Montgomery |
| 5,988,199 | A | 11/1999 | Ryan et al. |
| 6,019,398 | A | 2/2000 | Powers |
| 6,041,806 | A | 3/2000 | Maichel |
| 6,286,542 | B1 | 9/2001 | Morain et al. |
| 6,357,470 | B1 | 3/2002 | Evans et al. |
| 7,104,572 | B1 | 9/2006 | Kane |
| 8,286,655 | B2 | 10/2012 | Farrelly |
| 8,857,858 | B2 | 10/2014 | Minich et al. |
| 2007/0104547 | A1 | 5/2007 | Russell |
| 2009/0065070 | A1 | 3/2009 | Jaehyun et al. |
| 2011/0192469 | A1 | 8/2011 | Yamashita et al. |
| 2013/0206252 | A1 | 8/2013 | Leto |

OTHER PUBLICATIONS

Intl. Search Report and Written Opinion for PCT App. No. PCT/US2018/037865 dated Jul. 23, 2018; 10 pages.

*Primary Examiner* — Reinaldo Sanchez-Medina
(74) *Attorney, Agent, or Firm* — Cook Alex Ltd.

(57) ABSTRACT

A water main tapping device and method includes a saddle body including an arcuate portion between a first end and a second end, wherein the saddle body includes a saddle opening at a location between the first end and the second end, and a corporation stop body formed integrally with and extending from the saddle body. The corporation stop body includes a base with an inlet cavity in fluid communication with the saddle opening, a housing extending from the base and having a valve cavity in which a rotatable valve is positioned and which is in fluid communication with the inlet cavity, and a connector end extending from the housing and including an outlet in fluid communication with the valve cavity.

19 Claims, 15 Drawing Sheets

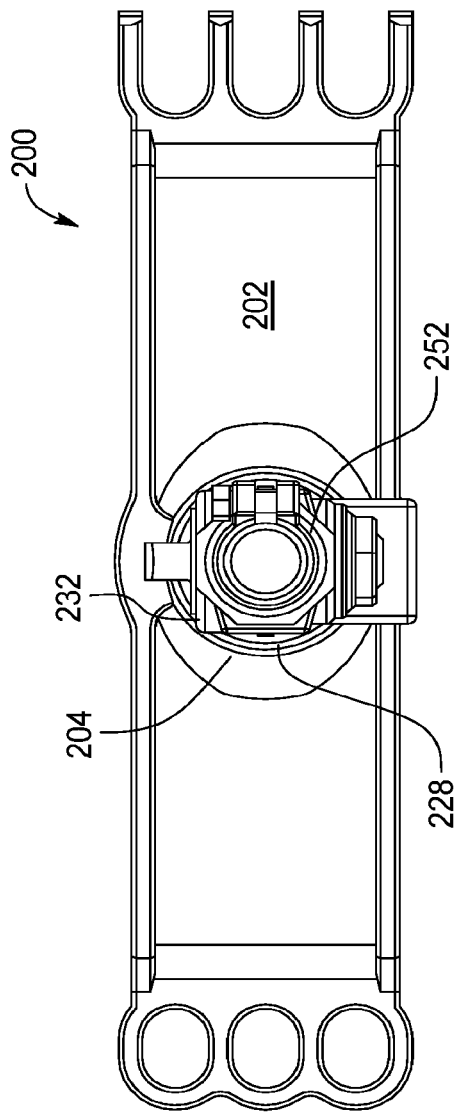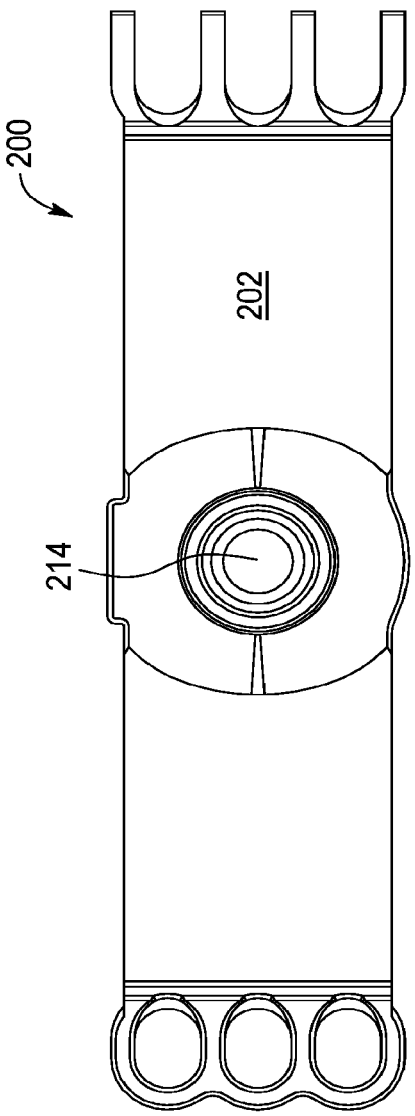

WATER MAIN TAPPING DEVICES AND METHODS

CROSS-REFERENCE TO RELATED APPLICATION

This application claims the benefit U.S. patent application Ser. No. 15/624,480 filed Jun. 15, 2017, which is hereby incorporated herein by reference in its entirety.

BACKGROUND OF THE INVENTION

The present subject matter relates generally to a water main tapping device. More specifically, the present invention relates to a water main tapping device that includes an integrated service saddle and corporation stop valve for use on a water main line.

In a given community, drinking water is provided to consumers through a water distribution system that includes a number of water mains with individual service lines branching outwardly therefrom. Water mains typically range between about 3 in. and about 36 in. in diameter and operate at a typical water pressure of between about 35 psi and about 150 psi. Tapping into a water main is necessary when water samples need to be collected, air release valves or chemical injectors need to be connected, or a new branch needs to be installed. Because of the high pressure within the water main, a corporation stop valve must be utilized to tap into the water main, as it allows for appropriate sealing under such pressure.

Use of a conventional corporation valve requires the following materials: a saddle including a centrally located gasketed opening, a corporation stop, and a rapid feed tapping drill. The saddle is first positioned about the water main and secured in place by tightening the bolts. Pipe thread tape is applied to the male threads of the corporation stop before the it is screwed into the female threads of the pipe saddle. Attention must be paid to the placement of the pipe thread tape, as applying the tape in the wrong direction will result in an unsealed joint. To screw the corporation stop into place, a smooth jawed wrench must be positioned carefully on the surface of the corporation valve to avoid damage. The corporation stop must not be overtightened, which would result in moving the saddle from its original location, thereby creating a leak path for the pressurized water. After the valve within the corporation stop is moved into the open position, the rapid feed pipe tapping drill is inserted into the corporation stop and the opening on the saddle so that drill bit strikes the water main. The drill is rotated until the drill bit has successfully perforated the water main. After removing the rapid feed tapping drill from the water main, the drill bit is backed off into the removal position in the pipe tapping drill adapter. The corporation stop is then moved into the closed position. With no pressure or leakage, the pipe tapping drill is now removed from the corporation stop. The new service line, the air release valve, the chemical injector, or the equipment for collecting samples is then connected to the corporation valve. Two wrenches are needed to secure the service line: one to hold the corporation valve, and another to tighten the service line to the valve.

Installation of the corporation stop valve onto the saddle necessitates several steps: preparation of different materials in variable outdoor conditions, application of finicky Teflon pipe thread tape, and the strenuous wrenching of a corporation stop down into the saddle. Misapplication or even the duration of use of the Teflon pipe thread tape can lead to corrosion, stripping, or otherwise damage to the threads of the corporation stop. Frequently, irregular torsion, misuse, or degradation by age causes ruptures in the seal due to stripping of the threads or removal of the pipe thread tape. Such leaks can occur often in the field due to lack of tightening, over tightening, and poorly applied pipe thread tape. Typically, at this level of construction, the newest employees get the job of getting in the hole/ditch to install saddles and corporation stops. This normally unskilled labor can propagate additional mistakes, as the specificity of the number of required turns to install the corporation stop in the saddle is quite high and often overlooked by more novice employees.

Existing corporation stop valves also require specific tools for complete functioning. One example is a specific style of wrench necessitated for maintenance of the stop valve, wherein the use of smooth jawed wrench on the flats provided nearest the thread being made up is preferred. Loose fitting pipe wrenches, improperly applied, can distort the body and cause a leak, especially on valves. Such specificity is common and can create situations in which maintenance crews lacking appropriate equipment must either abandon the repair or proceed and endanger the integrity of the corporation stop.

Absent employee error, the external male threads of the corporation stop can be damaged by external factors, or by negligence in manufacturing that is passed along to the user. In the field, threads can be easily damaged by lack of care or negligence by workers. For example, exposed threads may become damaged by being hit by tools in a truck bed or dented by rocks, asphalt, or concrete at the installation site before installation. Threads must be protected as nicks or distorted threads can cause leaks between the female threads of the saddle and the male threads of the corporation stop.

Additionally, installation of the corporation stop valve can be dangerous for users to install and work on. Injuries to the knuckles and hands are common, and the danger is expedited when the work is conducted in the presence of a pressurized water main. Moreover, since water mains are buried under streets, a leaking saddle and corporation stop connection typically will not manifest itself for some time, thus causing costly repair and back charges with negative effects on communities, because the street will have to be closed off, isolated, and dug up again in order to replace the leaking corporation stop. The repairs lead to a lack of water supply, which may become costly for local business are affected.

Accordingly, there is a need for a water main tapping device that minimizes the components and tools needed, thereby minimizing the chances for damage and leakage during and after installation.

BRIEF SUMMARY OF THE INVENTION

To meet the needs described above and others, the present disclosure provides a water main tapping device that includes an integral saddle and corporation stop configuration. By providing a singular device incorporating both the saddle and the corporation stop, the water main tapping device enables a more simplified installation process constituting fewer steps, resulting in a significantly diminished chance of leakage and decreased risk of user injury.

During use, the water main tapping device mates with a saddle back plate to form a tight fit around a water main line. In some embodiments, the water main tapping device is made of stainless steel, although any suitable material as is known in the art may be used.

The saddle body of the water main tapping device of the present application has an arcuate shape that extends between a first clamp end and a second clamp end. A saddle opening at a midpoint between the first and second clamp ends allows for direct access to the water main during use.

The corporation stop body includes a base that joins the saddle body adjacent to the saddle opening, a housing atop the base, and a connector end atop the housing. An inlet cavity within the base is in fluid communication with the saddle opening. A housing supported by the base includes a valve cavity in which a valve is positioned and rotatable between an open position and a closed position. The valve may be a ball valve, a plug valve, or any other suitable valve as desired. The housing also includes an upper bore and a lower bore above and below the valve cavity. The upper bore connects the valve cavity to the inlet cavity of the base. The connector end extends above the housing and includes an outlet cavity that is in fluid communication with the upper bore of the housing. The opening of the saddle body, the inlet cavity, the valve cavity, and the outlet cavity are in fluid communication. The upper and lower bores also provide fluid communication between the inlet cavity, the valve cavity, and the outlet cavity.

In some embodiments, the water main tapping device may include an adapter mounted onto the connector end of the corporation stop body for connecting to a variety of service line sizes.

In one example, the water main tapping device includes a saddle body including an arcuate shape between a first clamp end and a second clamp end, wherein the saddle body includes a saddle opening at a point between the first clamp end and the second clamp end, and a corporation stop body formed integrally with the saddle body at the saddle opening. The corporation stop body includes a base on the saddle body, a housing atop the base, and a connector end atop the housing. A valve housed in a valve cavity within the housing of the corporation stop body. The base of the corporation stop body includes an inlet cavity and the connector end of the corporation stop body includes an outlet cavity, and the opening of the saddle body, the inlet cavity, the valve cavity, and the outlet cavity are in fluid communication.

The valve may be a ball valve, a plug valve, or any other suitable valve. The outer surface of the connector end and/or the inner surface of the adapter may be threaded.

In a further example, a method of tapping a water main under pressure using a drill includes the step of providing a water main tapping device. The water main tapping device includes a saddle body including an arcuate shape between a first clamp end and a second clamp end, wherein the saddle body includes a saddle opening at a point between the first clamp end and the second clamp end, and a corporation stop body formed integrally with the saddle body at the saddle opening. The corporation stop body includes a base on the saddle body, a housing atop the base, and a connector end atop the housing. A valve housed in a valve cavity within the housing of the corporation stop body. The base of the corporation stop body includes an inlet cavity and the connector end of the corporation stop body includes an outlet cavity, and the opening of the saddle body, the inlet cavity, the valve cavity, and the outlet cavity are in fluid communication.

The method further includes the steps of securing the water main tapping device to a saddle back plate about the water main by tightening a plurality of nuts about a plurality of bolts positioned through the first and second camp ends and the saddle back plate; inserting the drill through the corporation stop body and the saddle opening to strike the water main; drilling into the water main; removing the drill from the water main tapping device; and connecting a service line to the connector end of the corporation stop body.

An object of the invention is to provide a water main tapping device that minimizes or eliminates leakage, simplifies the installation process, and reduces the likelihood of damage on the device.

An advantage of the invention is that it eliminates the male-female connection of the corporation stop and the saddle assembly, resulting in the elimination of leakage at that juncture due to damaged threads at the connection and/or improper application of pipe thread tape and the reduction of time to install the new service line.

Another advantage of the invention is to avoid incongruous parts by simplifying the number of required tools and components to tap a water main. As an example, the water main tapping device of the present application does not require the use of a specific wrench to tighten the corporation stop onto the saddle, and thus eliminates the possibility of damaging the corporation stop using the wrong tool, or even the correct tool, incorrectly.

A further advantage of the invention is avoiding future construction and repair necessary to address slow leaks that fail to manifest themselves until years after installation.

Yet another advantage of the present invention are the safety advantages. Because the water main tapping device requires fewer components and consequently fewer installation steps, users are less likely to injure their hands and knuckles during installation.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 14 is a plan view of the water main tapping device of FIG. 9.

FIG. 15 is a bottom plan view of the water main tapping device of FIG. 9.

DETAILED DESCRIPTION OF THE INVENTION

Figure 1:
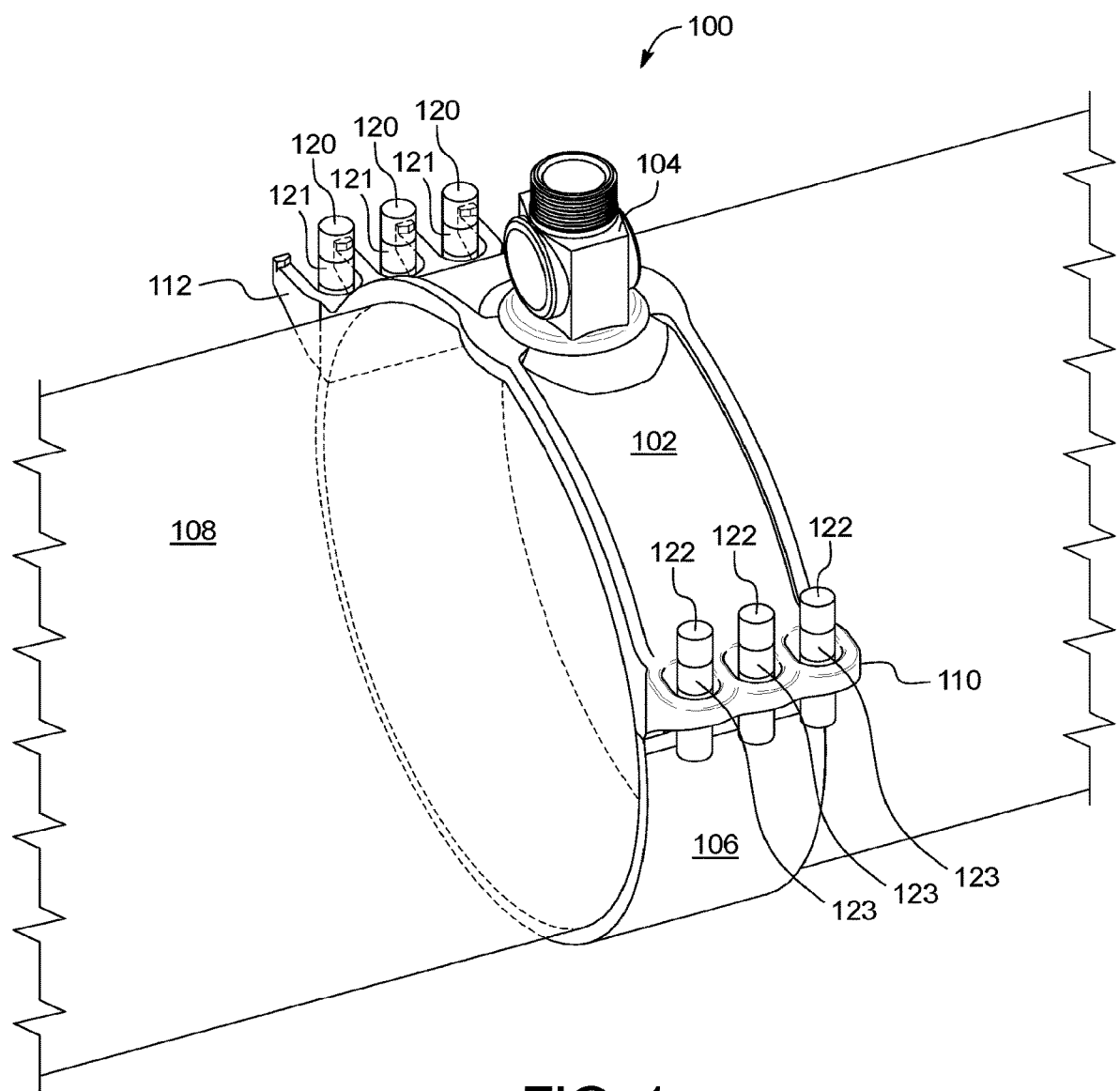
FIG. 1 is a perspective view of a water main tapping device of the present application.

FIGS. 1-9F illustrate an example of a water main tapping device 100. As shown in FIG. 1, the water main tapping device 100 includes a saddle body 102 and a corporation stop body 104 formed integrally together. The water main tapping device 100 mates with a saddle back plate 106 to form a tight fit around a water main line 108. The water main tapping device 100 can be formed from any structural material appropriate such as stainless steel, "no-lead brass", and ductile iron per ASTM A536. Of course, numerous known substitutes may be used, as will be recognized by those skilled in the art.

Figure 2:
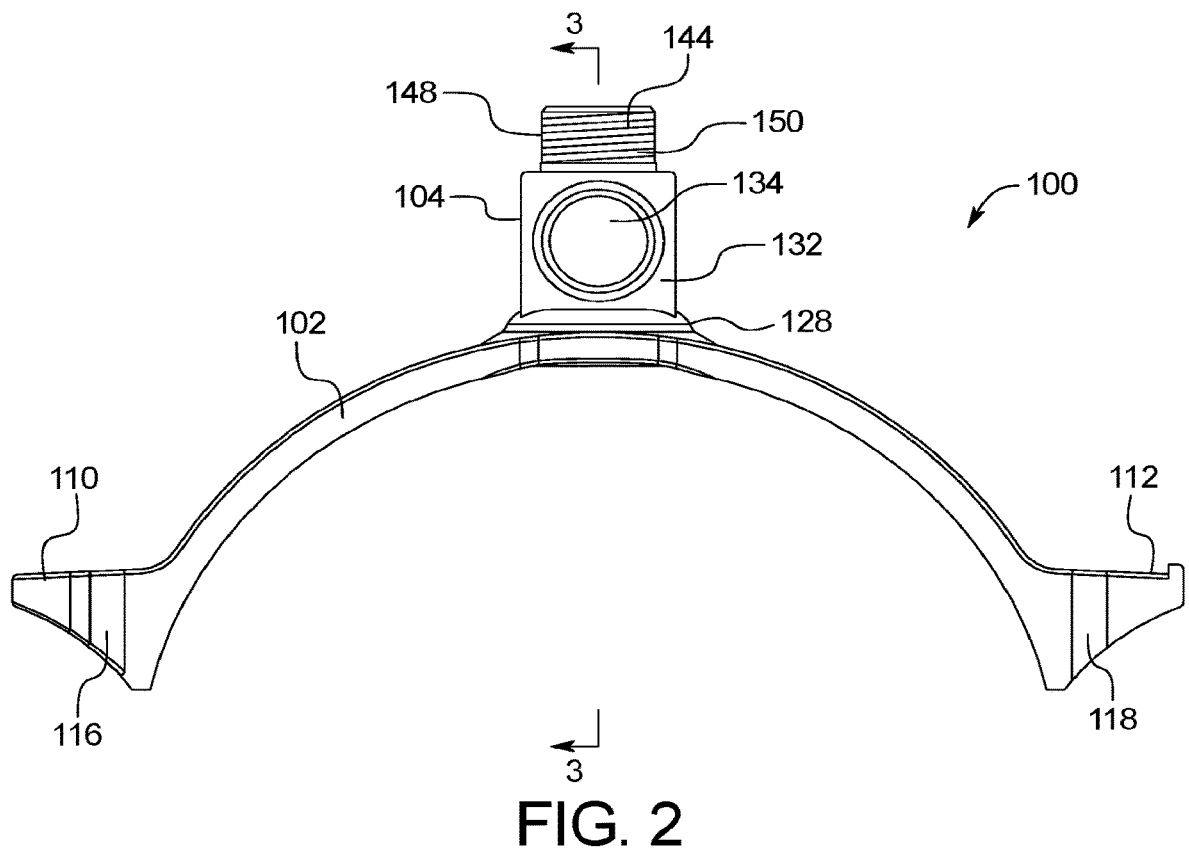
FIG. 2 is a front view of the water main tapping device of FIG. 1.

Referring to FIG. 2, the saddle body 102 extends between a first clamp end 110 and a second clamp end 112. The saddle body 102 has an arcuate shape that corresponds to the cross-sectional shape of the water main 108. A saddle opening 114 at a midpoint between the first and second clamp ends 110, 112 allows for direct access to the water main 108 during use.

Figure 6:
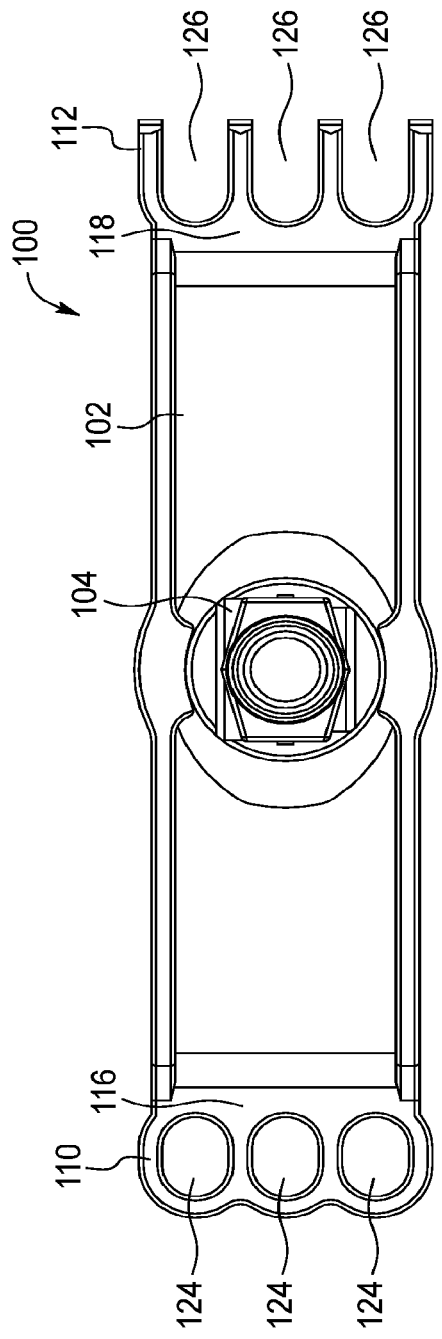
FIG. 6 is a plan view of the water main tapping device of FIG. 1.
Figure 7:
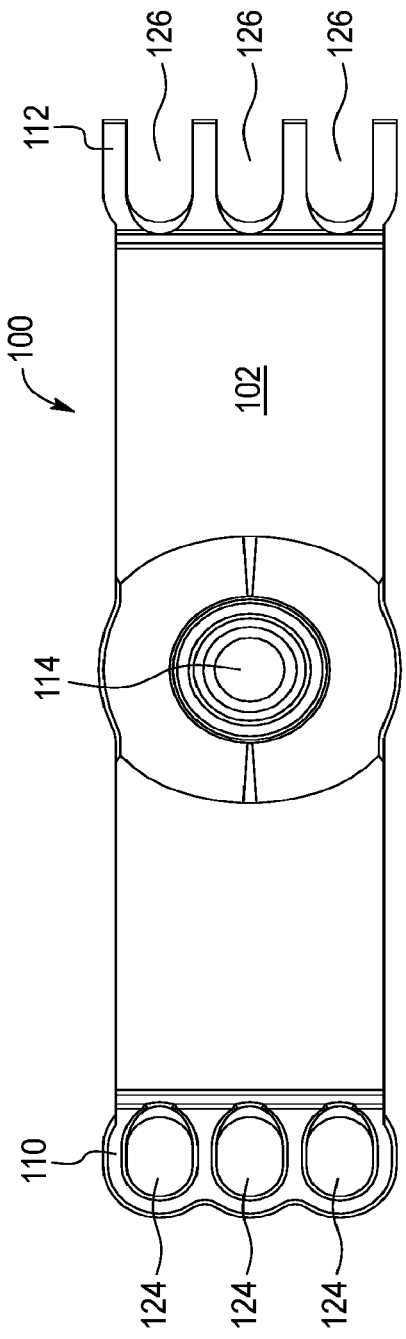
FIG. 7 is a bottom plan view of the water main tapping device of FIG. 1.

As shown in FIGS. 6 and 7, each of the first and second clamp ends 110, 112 include a first and second shoulder portion 116, 118, respectively, for receiving and supporting bolts 120, 122 and nuts 121, 123 (FIG. 1) that secure the water main tapping device 100 to the saddle back plate 106. The first shoulder portion 116 includes a plurality of openings 124 for receiving a first plurality of bolts 120, and the second shoulder portion 118 includes a plurality of U-shaped grooves 126 (see FIG. 4) for receiving a second plurality of bolts 122.

Figure 3:
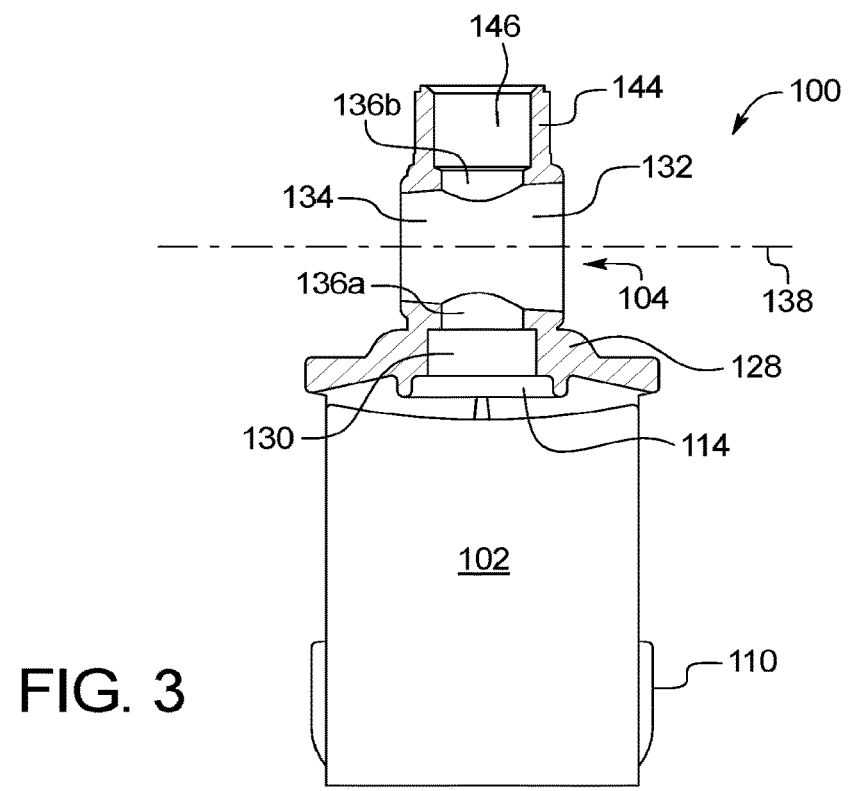
FIG. 3 is a cross-sectional view generally taken along lines 3-3 of the water main tapping device of FIG. 1.
Figure 4:
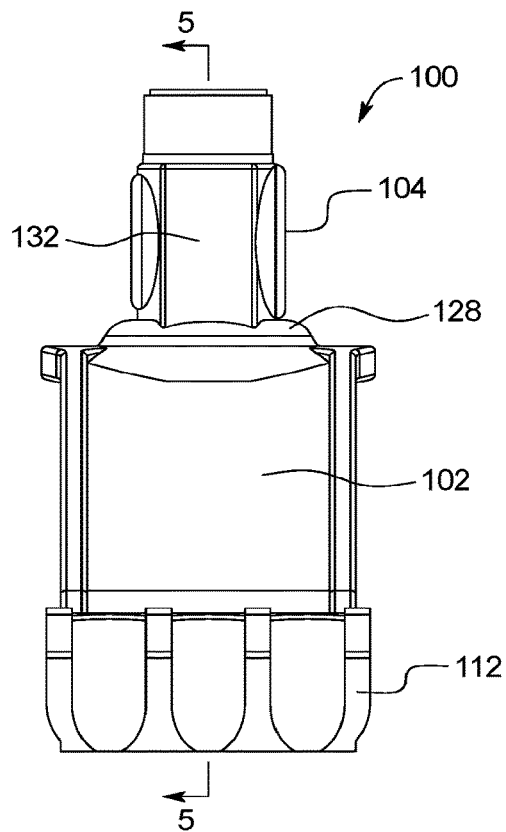
FIG. 4 is a side elevational view of the water main tapping device of FIG. 1.
Figure 5:
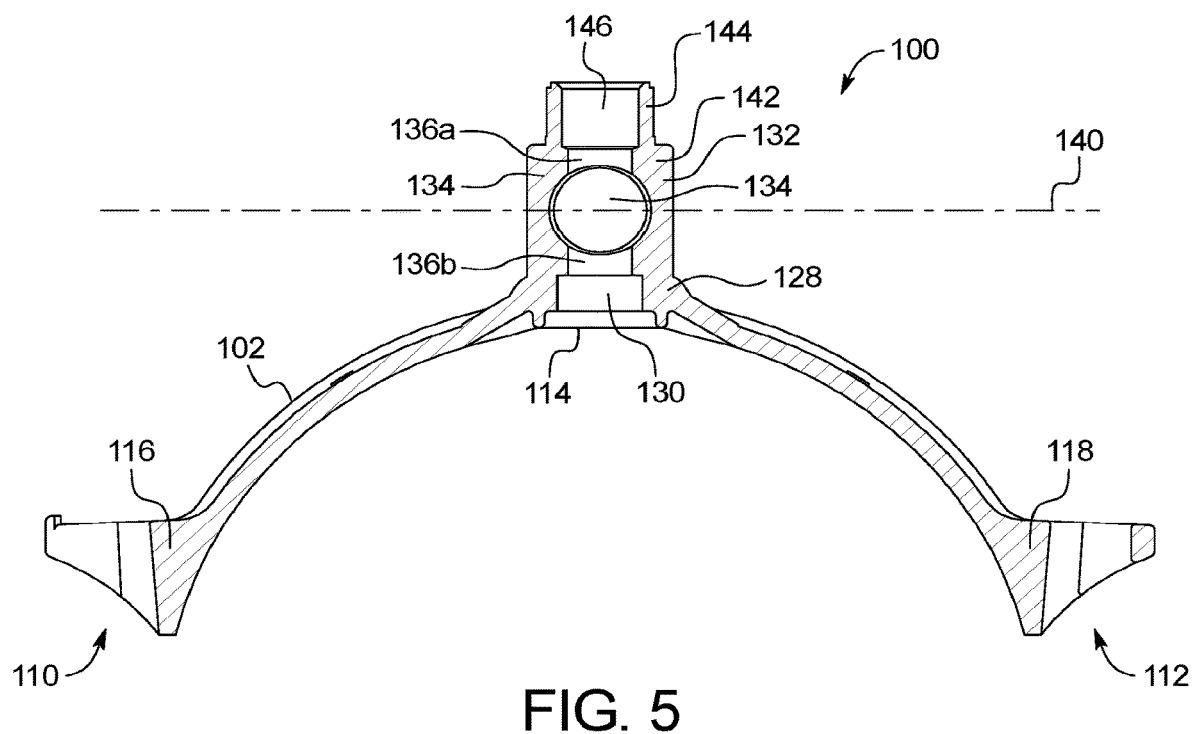
FIG. 5 is a cross-sectional view generally taken along lines 5-5 of the water main tapping device of FIG. 1.

Seen best in FIG. 3, the corporation stop body 104 joins the saddle body 102 at a base 128 formed around the saddle opening 114. The base 128 includes an inlet cavity 130 that is in fluid communication with the saddle opening 114. The base 128 has a base thickness that is greater than a thickness of the saddle body 102.

Figure 8A:
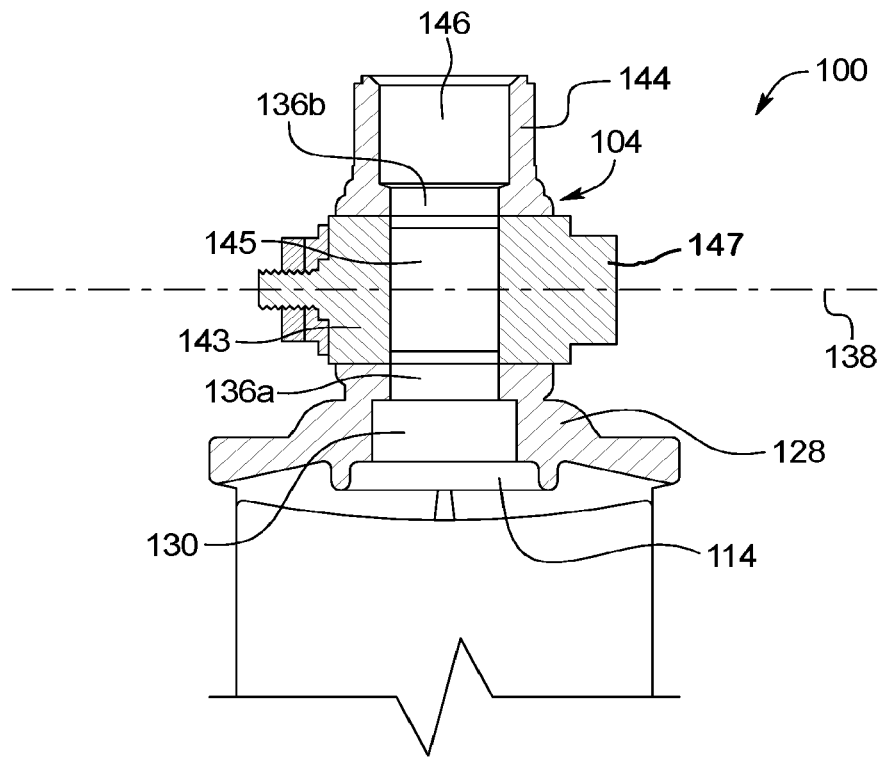
FIGS. 8A and 8B are cross-sectional views generally taken along lines 3-3 of the water main tapping device of FIG. 1 showing a valve stopper in the open and closed positions, respectively.
Figure 8B:
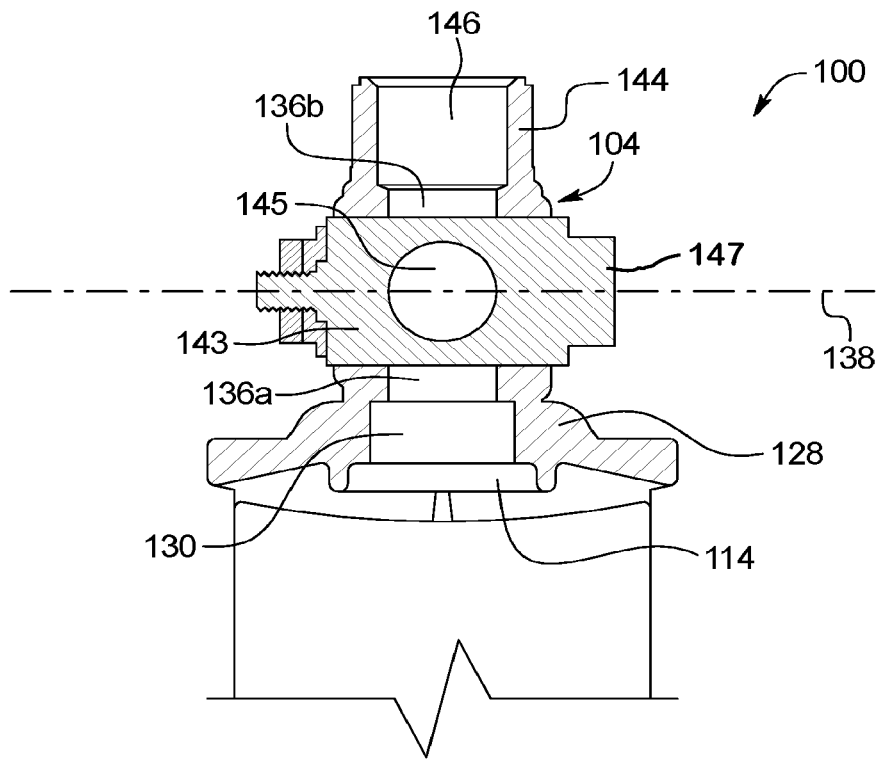

Referring to FIGS. 2-5, the corporation stop body 104 also includes a housing 132 that is supported by the base 128. A valve (not shown), such as, but not limited to, a ball valve, is positioned within a valve cavity 134 of the housing 132 and moves between an open position, permitting water flow through the water main tapping device 100, and a closed position, preventing water from flowing through the water main tapping device 100. The housing 132 also includes an upper bore 136a above the valve cavity 134 and a lower bore 136b below the valve cavity 134. The upper bore 136a connects the valve cavity 134 with the inlet cavity 130 of the base 128. In the embodiment illustrated in FIGS. 1-7, the valve cavity 134 extends fully through the housing 132 along a first axis 138 parallel to the water main 108. Along a second axis 140 perpendicular to the water main 108, the valve cavity 134 includes side walls 142 that are shaped to receive a ball valve (not shown). Referring to FIGS. 8A and 8B, a valve stopper 143 is shown in the open and closed positions, respectively, within the valve body 104. Specifically, the valve stopper 143 includes a valve stopper bore 145 that is aligned with the cavities 114, 130, 146 of the valve body 104 in the open position. In the closed position, the valve stopper bore 145 is transverse to the cavities 114, 130, 146 of the valve body 104. A user rotates the valve stopper 143 by manipulating a key 147 on the valve stopper 143 that is positioned external to the valve body 104. In other embodiments, the side walls 142 may be shaped to accommodate any size or shape of valve as preferred.

Finally, the corporation stop body 104 also includes a connector end 144 extending above the housing 132. The connector end 144 includes an outlet cavity 146 that is in fluid communication with the upper bore 136b of the housing 132, thereby also in fluid communication with the valve cavity 134, the inlet cavity 130, and the saddle opening 114. A plurality of threads 148 on an outer surface 150 of the connector end 144 are used to attach piping or other tools for conveying water from the water main 108.

In the embodiment illustrated in FIGS. 9A-9F, the illustrated water main tapping device 100 has the dimensions recited in the following table, it being understood that the dimensions are exemplary only and do not limit the scope of any claims herein, except as may be recited thereby, together with equivalents thereof:

TABLE 1

Figure 9A:
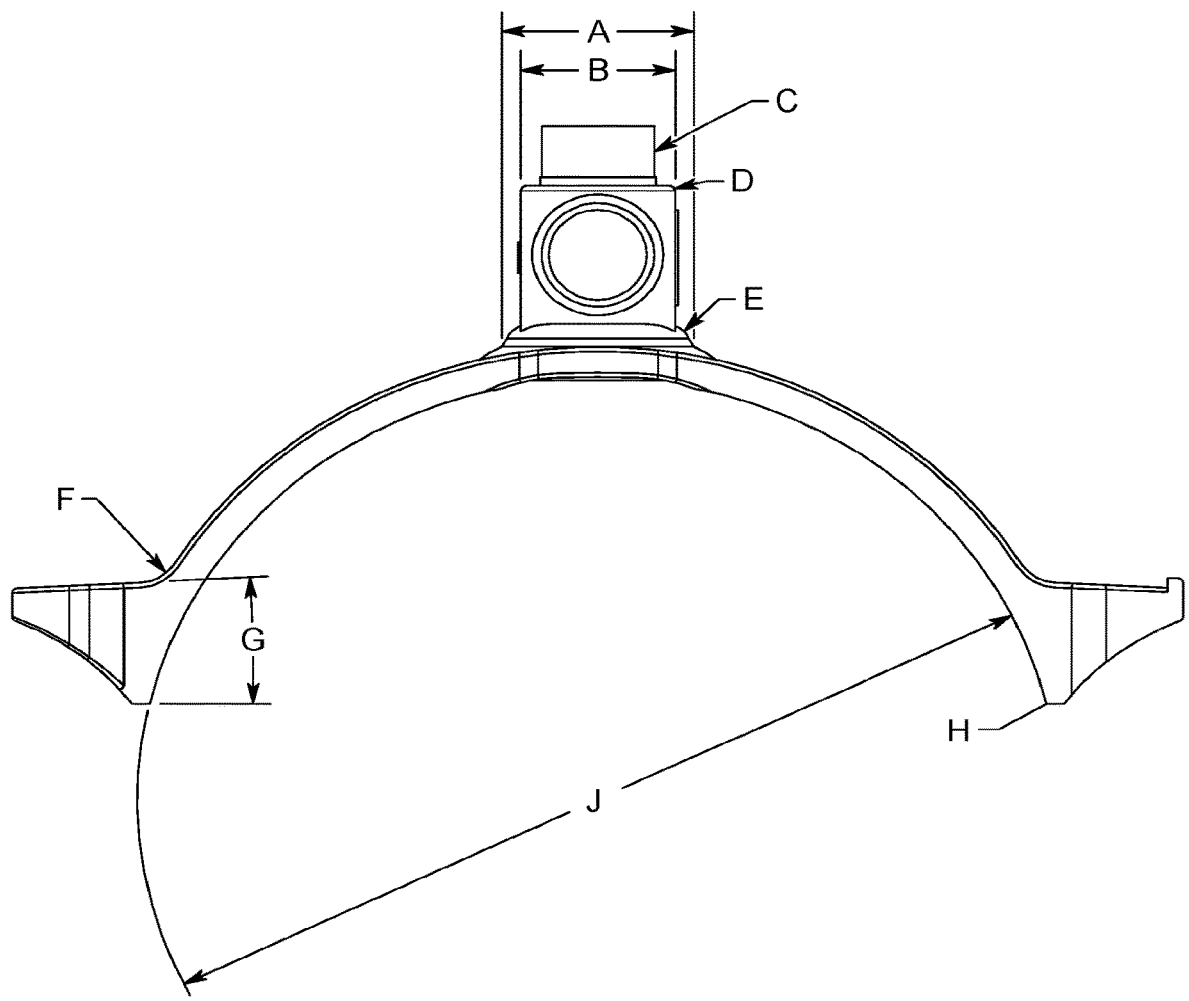
FIGS. 9A-9F include the views of FIGS. 2-7 including exemplary dimension of the water main tapping device of FIG. 1.
Figure 9B:
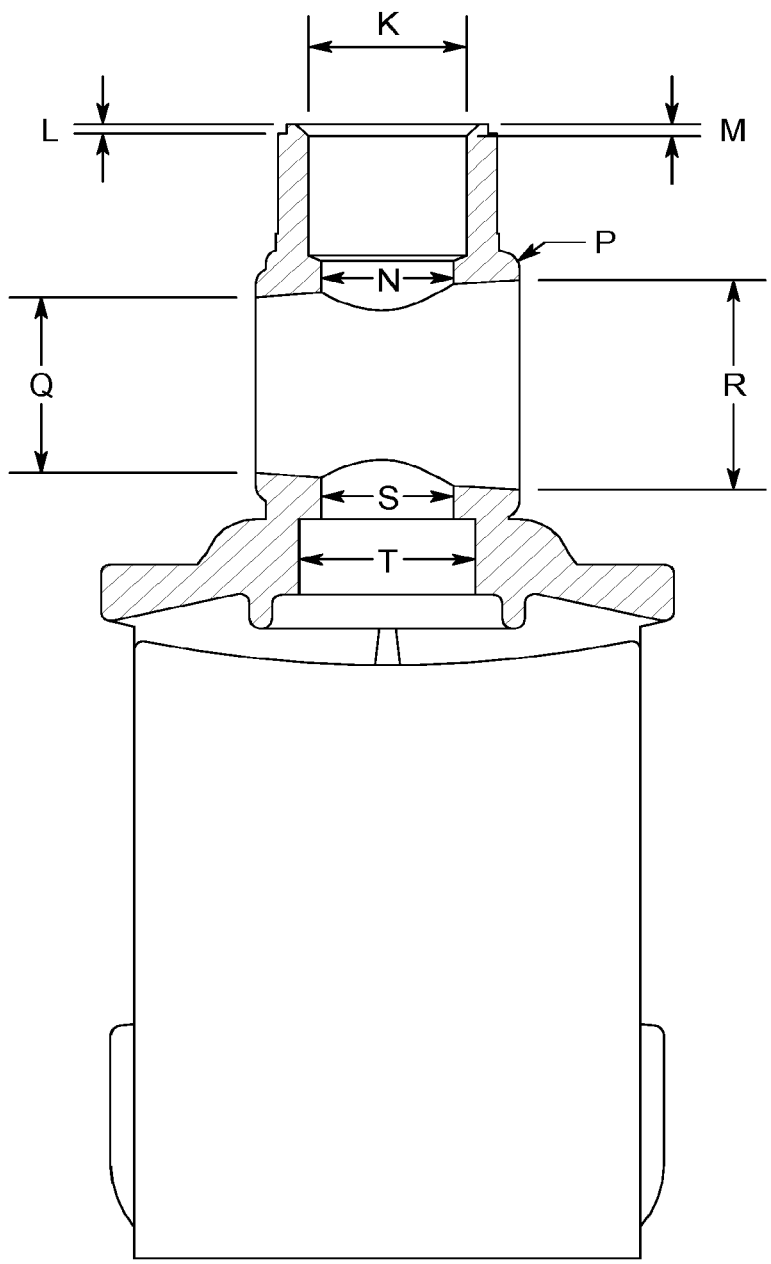
Figure 9C:
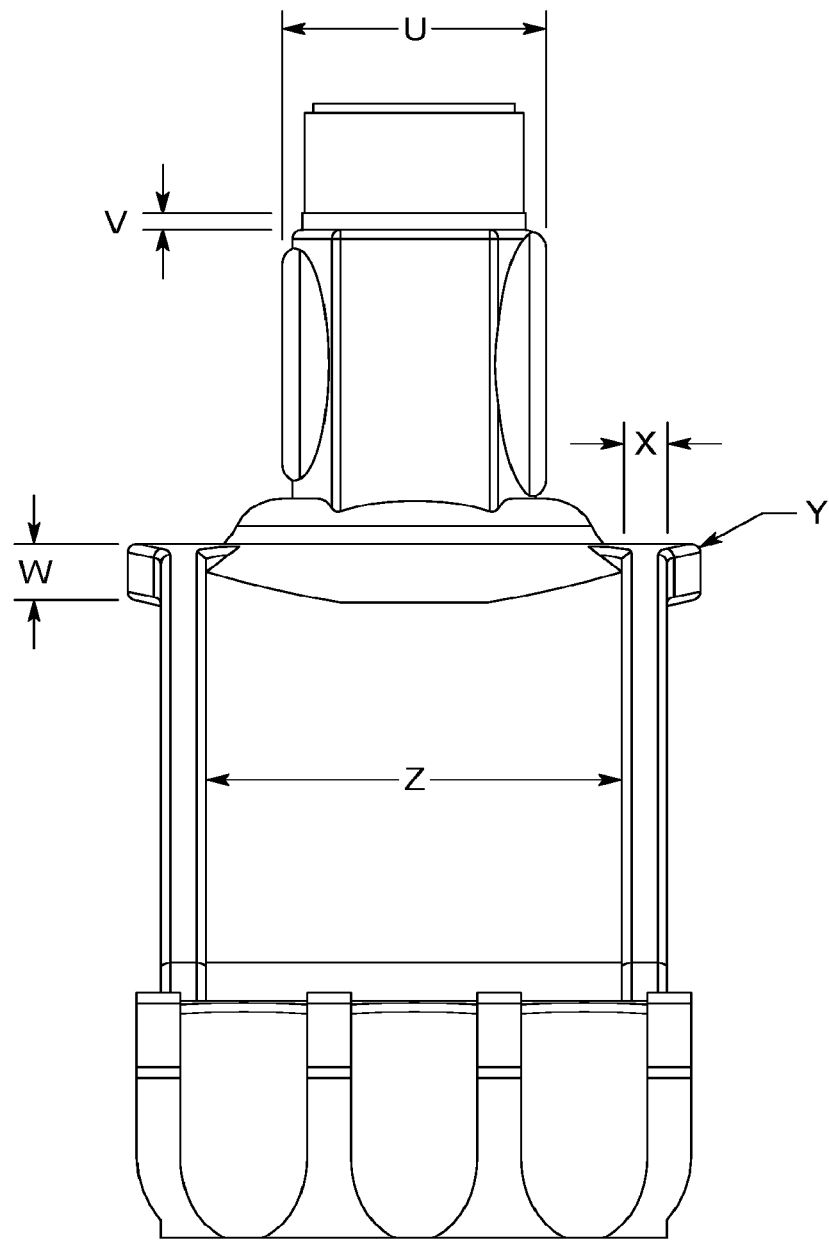
Figure 9D:
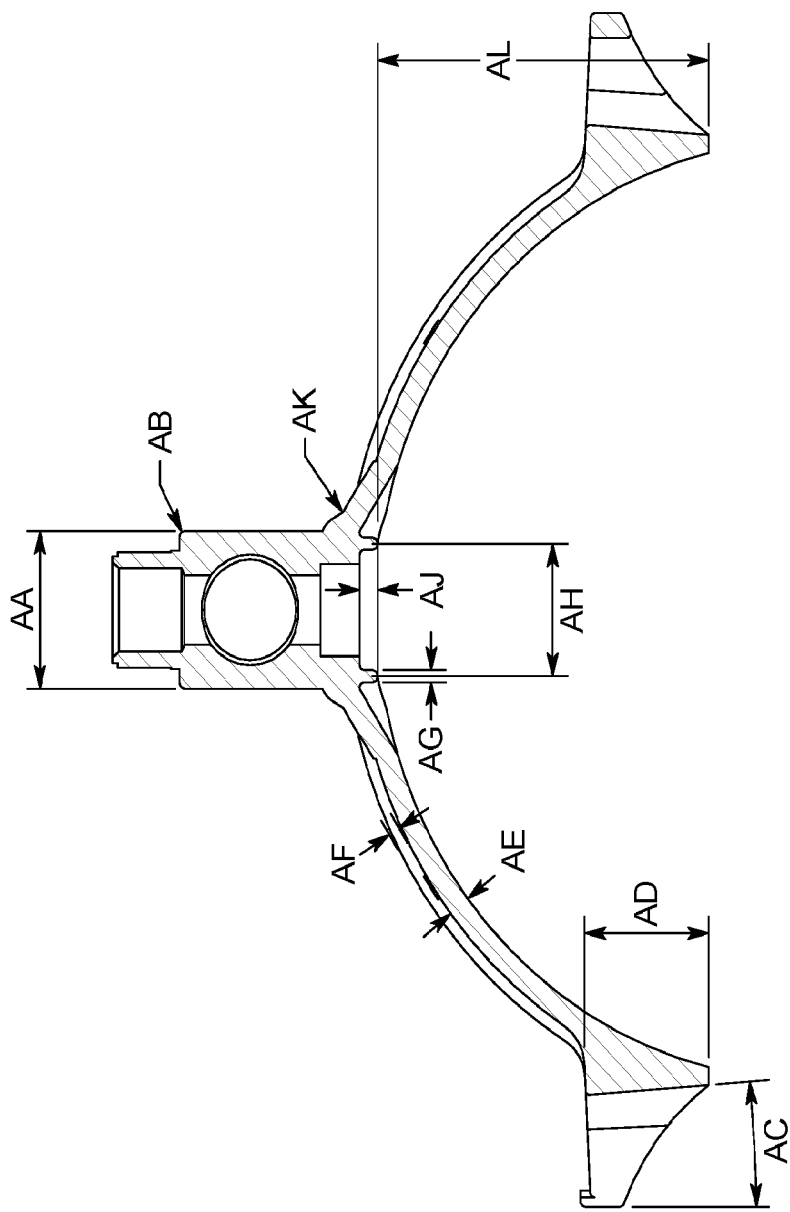

| Dimensions for FIGS. 8A-9F | |
|---|---|
| | Dimensions (in., unless otherwise specified) |
| FIG. 9A | |
| A | 2.158 |
| B | 1.688 |
| C | 1 |
| D | 0.05 (radius of curvature) |
| E | 0.30 (radius of curvature) |
| F | 0.50 (radius of curvature) |
| G | 3 degrees |
| H | 0.06 (radius of curvature) |
| J | "B" (see Table 2 below) |
| FIG. 9B | |
| K | 0.900 |
| L | 0.057 |
| M | 0.0725 (chamfer) |
| N | 0.75 |
| P | 0.10 (radius of curvature) |
| Q | 1.097 |
| R | 1.305 |
| S | 0.75 |
| T | 1.00 |
| FIG. 9C | |
| U | 1.500 |
| V | 0.105 |
| W | 0.352 |
| X | 0.25 |
| Y | 0.05 (radius of curvature) |
| Z | 2.380 |
| FIG. 9D | |
| AA | 1.688 |
| AB | 0.05 (radius of curvature) |
| AC | 5 degrees |
| AD | "F" (see Table 2 below) |
| AE | 0.250 |
| AF | 0.131 |
| AG | 0.124 |
| AH | 1.44 |

TABLE 1-continued

Dimensions for FIGS. 8A-9F

Figure 9E:
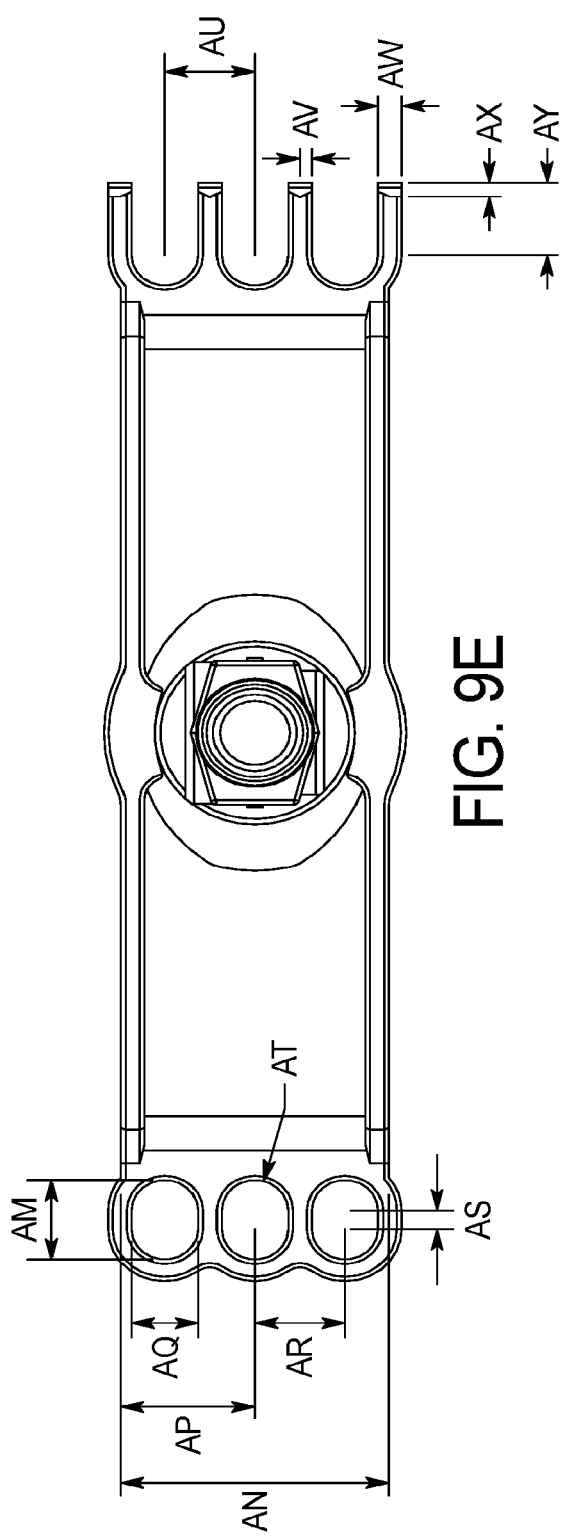
Figure 9F:
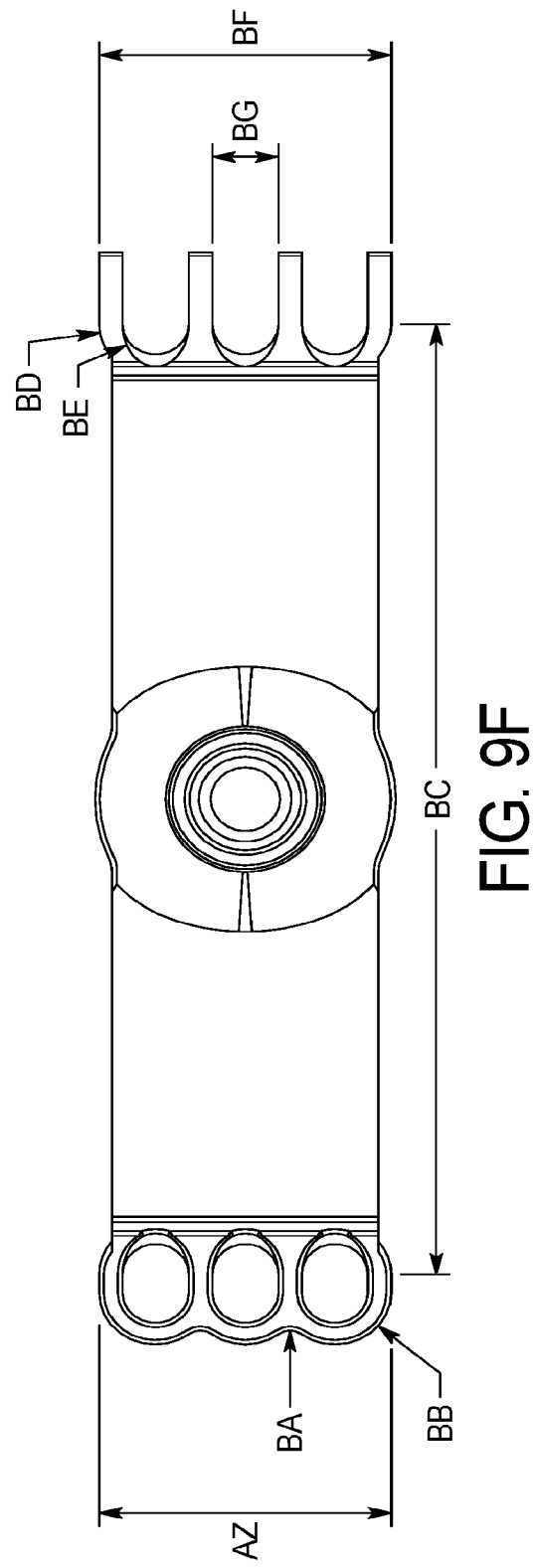

| | Dimensions (in., unless otherwise specified) |
|---|---|
| AJ | 0.209 |
| AK | 0.50 (radius of curvature) |
| AL | "C" (see Table 2 below) |
| FIG. 9E | |
| AM | 0.940 |
| AN | 2.88 |
| AP | 1.44 |
| AQ | 0.718 |
| AR | 0.97 |
| AS | 0.222 |
| AT | 0.359 (radius of curvature) |
| AU | 0.969 |
| AV | 0.126 |
| AW | 0.252 |
| AX | 0.170 |
| AY | 0.85 |
| FIG. 9F | |
| AZ | 3.156 |
| BA | 0.190 (radius of curvature) |
| BB | 0.609 (radius of curvature) |
| BC | "D" (see Table 2 below) |
| BD | 0.61 (radius of curvature) |
| BE | 0.41 (radius of curvature) |
| BF | 3.160 |
| BG | 0.718 |
| BH | "E" (see Table 2 below) |

TABLE 2

Dimensions for "B"-"E" of FIGS. 9A-9F

| Various Part Nos. | "B" | "C" | "D" | "E" | "F" |
|---|---|---|---|---|---|
| 1 | 4.60 | 1.78 | 5.79 | 2.89 | 1.19 |
| 2 | 6.73 | 2.61 | 7.86 | 3.93 | 1.19 |
| 3 | 8.73 | 3.38 | 9.86 | 4.93 | 1.44 |
| 4 | 11.20 | 4.34 | 12.26 | 6.13 | 1.44 |
| 5 | 13.30 | 5.15 | 14.31 | 7.16 | 1.44 |

Figure 10:
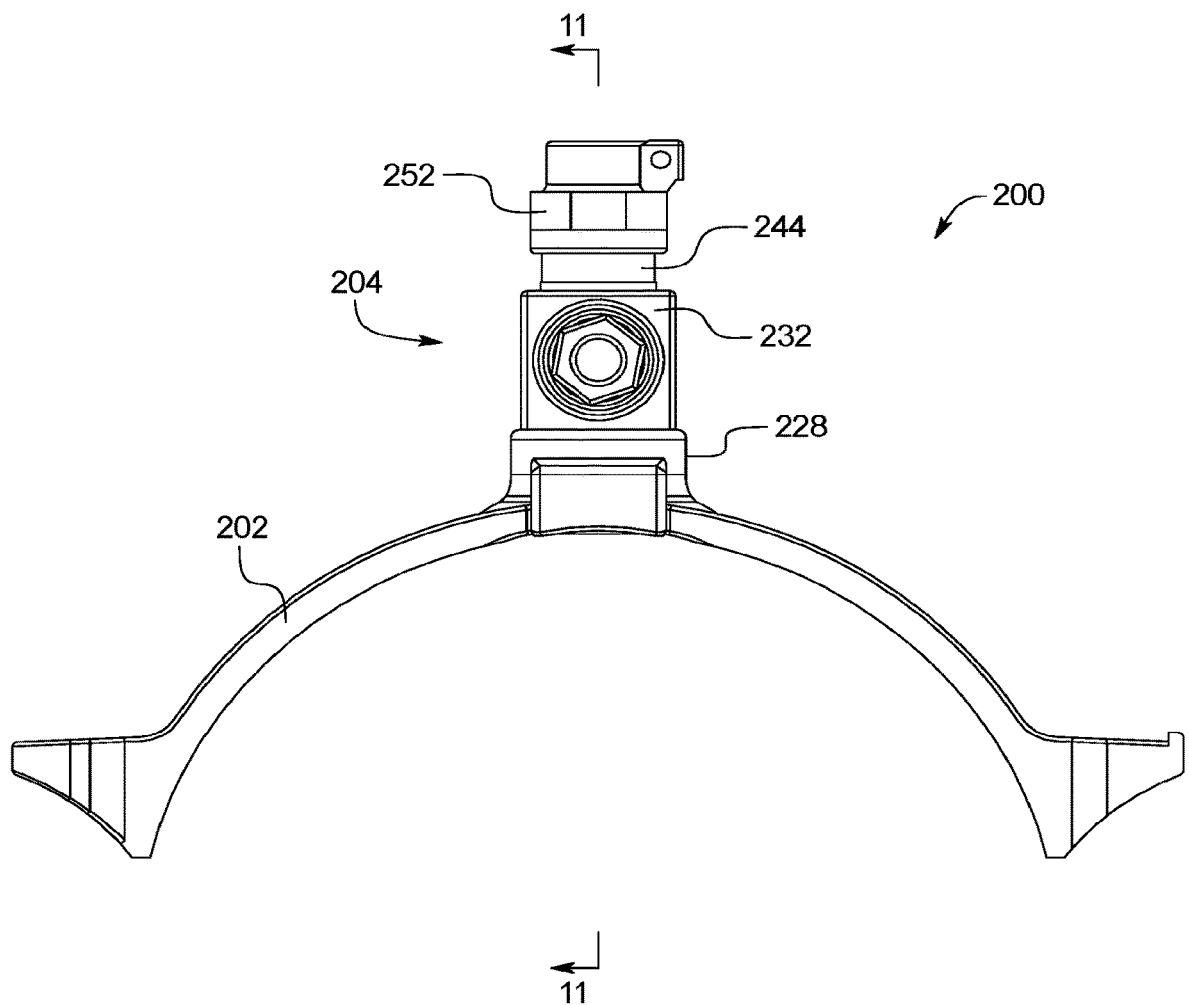
FIG. 10 is a front view of a further embodiment of a water main tapping device of the present application.
Figure 11:
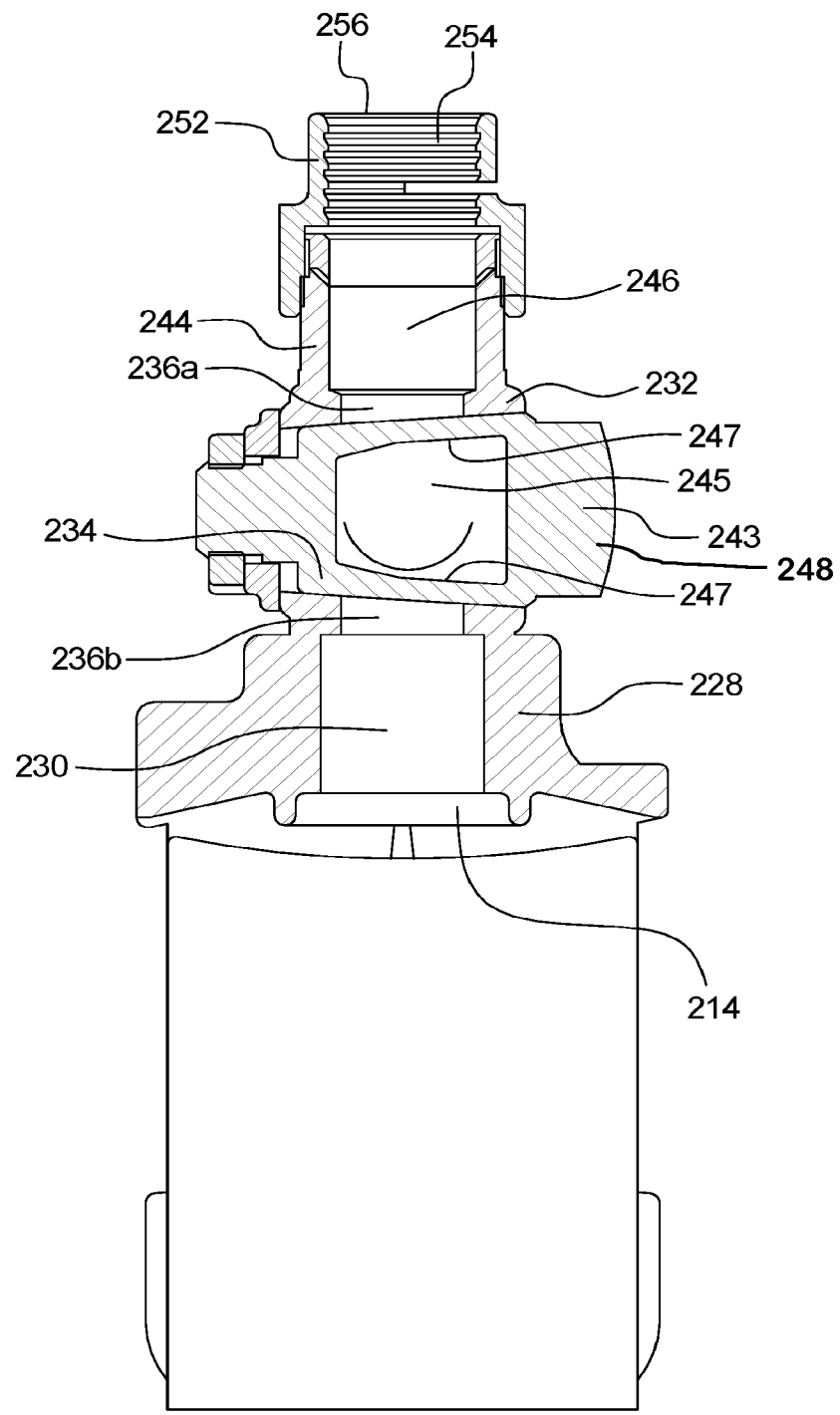
FIG. 11 is a cross-sectional view generally taken along lines 10-10 of the water main tapping device of FIG. 9.
Figure 12:
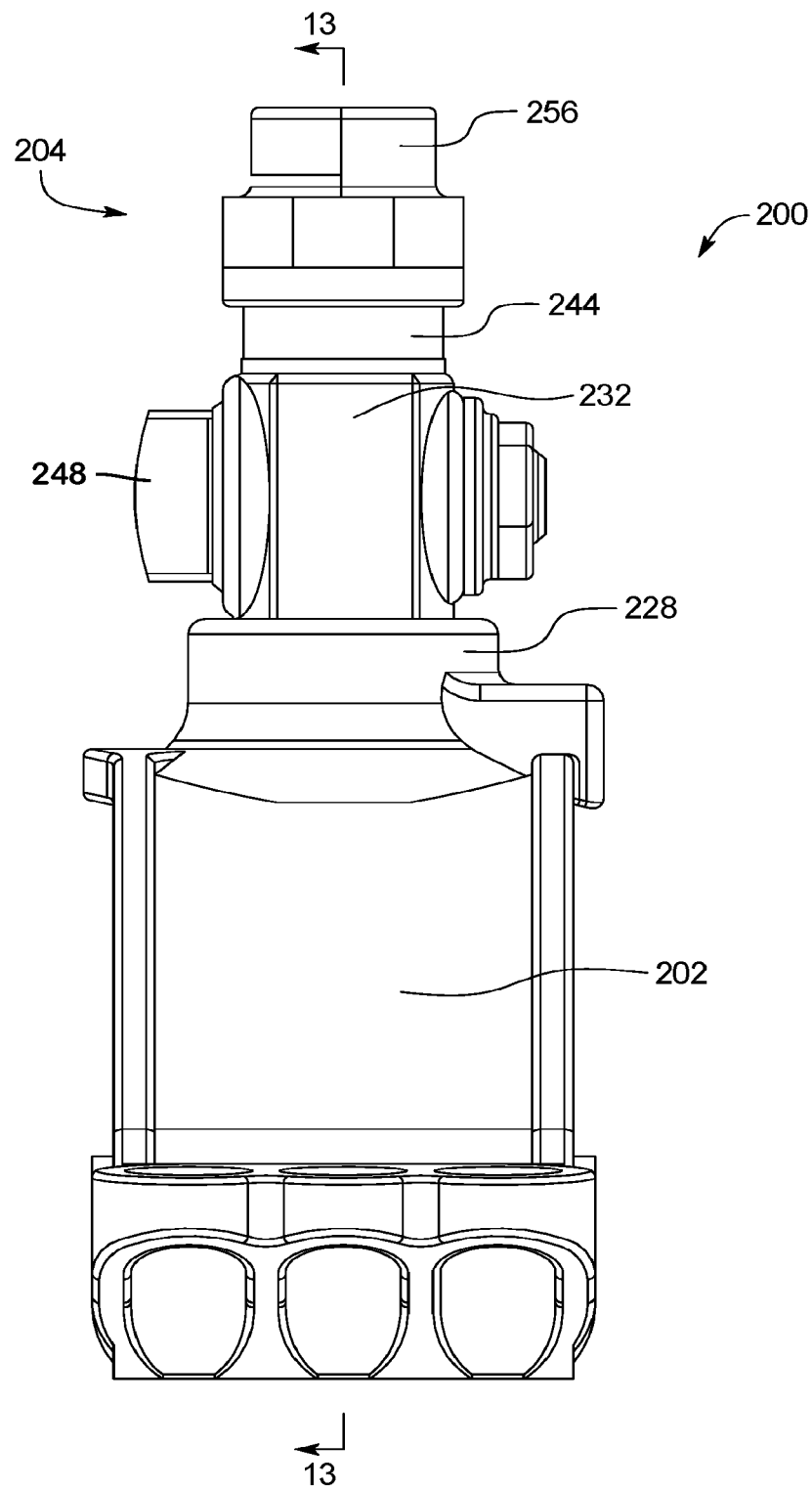
FIG. 12 is a side elevational view of the water main tapping device of FIG. 9.

FIGS. 10-15 illustrate a second embodiment of the water main tapping device 200 of the present application that utilizes a plug valve 243 in lieu of the ball valve of the water main tapping device 100 of FIGS. 1-8B. Similar to the water main tapping device 100, the water main tapping device 200 includes a corporation stop body 204 formed integrally with a saddle body 202 as shown in FIG. 10. Referring to FIG. 11, the corporation stop body 204 includes a base 228 on the saddle body 202, a housing 232 atop the base 228, and a connector end 244 atop the housing 232. The saddle opening 214, the inlet cavity 230 of the base 228, the valve cavity 234 of the housing 232, and the outlet cavity 246 of the connector end 244 are in fluid communication. The bore 236 extending through the housing 232 connects the inlet cavity 230 and the outlet cavity 246.

Figure 13:
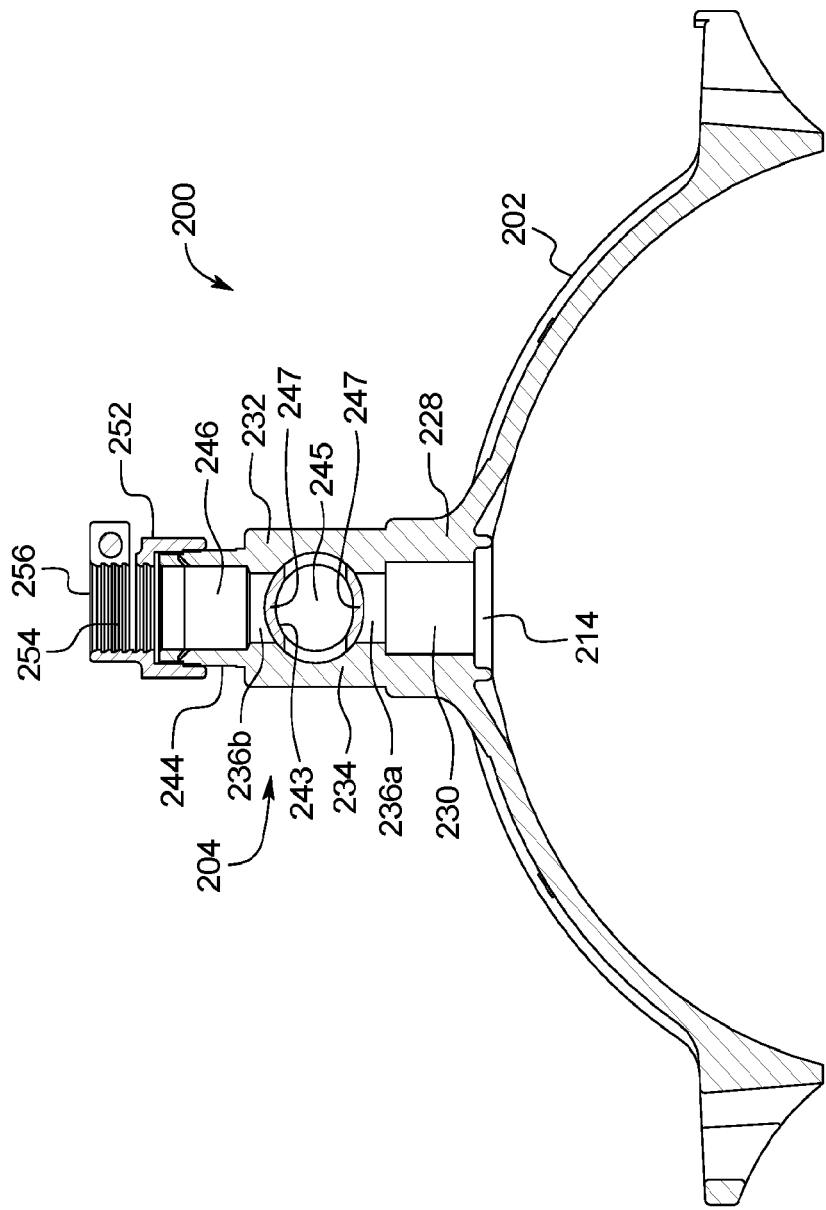
FIG. 13 is a cross-sectional view generally taken along lines 12-12 of the water main tapping device of FIG. 9.

FIG. 13 illustrates side walls 242 of the housing 232 of the corporation stop body 204 defining a valve cavity 234 that is shaped to retain the plug valve 243. Seen best in FIGS. 11 and 13, the plug valve 243 includes a plug valve port 245 that extends through a plug valve body 247. By manipulating a key 248, the plug valve 243 may be rotated between an open position, where the plug valve port 245 is aligned with the bore 236 of the housing 232, and a closed position, where the plug valve body 247 is aligned with the bore 236 of the housing 232 as shown in FIG. 13, thereby preventing water from flowing through.

Further, an adaptor 252 may be provided on the connection end 244 of the corporation stop body 204 for connecting to various sized outlet pipes or service lines. A plurality of threads 254 on an inner surface 256 of the adaptor 252 allows for such connection. Alternatively, an outlet pipe, a service line, an air release valve, a chemical injector, or any other suitable apparatus may connect directly to the connection end 244 of the corporation stop body 204.

During use, a user secures the water main tapping device 100 about a water main 108 by threading bolts 120, 122 either through or secured to the saddle back plate 106 through the first and second clamp ends 110, 112 and tightening nuts 121, 123 about the bolts 120, 122 to ensure a secure fit. The valve within the corporation stop body 104 is moved into the open position.

Next, a hot tapping drill is inserted through the connector end 144, the housing 132, the base 128, and the saddle opening 114 of the water main tapping device 100. The user operates the drill to penetrate the water main 108.

Once the water main 108 has been penetrated, and the user withdraws the drill from the water main 108, from the corporation stop body 104, and into the tapping drill adapter. The user then closes the valve stopper 143 within the corporation stop body 104. The hot tapping drill is then removed from the corporation stop body 104. An outlet pipe, service line, air release valve, chemical injector, or other containers for collecting water samples, may be attached to the connector end 144 of the corporation stop body 104. Once the connection is secure, the valve is opened.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A water main tapping device for receiving a drill comprising:
   a saddle body including an arcuate portion having a length between a first end and a second end and a width extending perpendicular to the length, wherein the saddle body includes a saddle opening in the arcuate portion located between the first end and the second end and the arcuate portion having a thickness adjacent the saddle opening;
   the arcuate portion of the saddle body having an arcuate surface configured for mounting adjacent a water main;
   a corporation stop body formed integrally as a single piece with and extending from the saddle body;
   the corporation stop body includes a base with an inlet cavity in fluid communication with the saddle opening, a housing extending from the base and having a valve cavity in which a rotatable valve is positioned and which is in fluid communication with the inlet cavity, and a connector end extending from the housing and including an outlet in fluid communication with the valve cavity;
   the base having a length and width, and the base extending from and providing added thickness to the arcuate portion of the saddle body adjacent the saddle opening;
   the housing having a length and width that are less than the length and width of the base, respectively;
   the rotatable valve comprising a valve element, wherein a bore extends through the valve element and is perpendicular to an axis of rotation of the valve element, wherein the bore through the valve element is located between and axially aligned with the saddle opening and the outlet when the valve element is in a fully open position, and when the valve element is rotated one quarter turn to a closed position the valve element occupies the same axial position as when in the fully open position but prevents fluid flow between the saddle opening and the outlet;

wherein the rotatable position of the valve element controls fluid flow between the saddle opening and the outlet; and wherein when the valve element is in the fully open position, a drill may be inserted through the axially aligned outlet, the bore through the valve element and the saddle opening.

2. The water main tapping device of claim 1, wherein the valve element comprises a ball or plug valve.

3. The water main tapping device of claim 1, wherein the integrally formed saddle body and corporation stop body comprise metal.

4. The water main tapping device of claim 3, wherein the metal further comprises stainless steel.

5. The water main tapping device of claim 1, wherein a surface of the connector end is threaded.

6. The water main tapping device of claim 1, further comprising an adapter threaded onto the connector end.

7. The water main tapping device of claim 1, further comprising a saddle back portion positioned opposite the saddle body and about the water main, wherein a first end of the saddle back portion is connected to the first end of the saddle body and a second end of the saddle back portion is connected to the second end of the saddle body.

8. The water main tapping device of claim 7, wherein the ends of the saddle back portion are connected to the ends of the saddle body by fasteners.

9. The water main tapping device of claim 1, wherein the base is circular.

10. The water main tapping device of claim 1, wherein the integrally formed saddle body and corporation stop body have a height that is no more than three times a largest radial dimension of the valve element.

11. A method of tapping a water main using a drill, comprising the steps of:
providing a water main tapping device comprising:
a saddle body including an arcuate portion having a length between a first end and a second end and a width extending perpendicular to the length, wherein the saddle body includes a saddle opening in the arcuate portion between the first end and the second end, and the arcuate portion having a thickness adjacent the saddle opening;
the arcuate portion of the saddle body having an arcuate surface configured for mounting adjacent the water main;
a corporation stop body formed integrally as a single piece with and extending from the saddle body;
the corporation stop body includes a base with an inlet cavity in fluid communication with the saddle opening, a housing extending from the base and having a valve cavity in which a rotatable valve is positioned and which is in fluid communication with the inlet cavity, and a connector end extending from the housing and including an outlet in fluid communication with the valve cavity;
the base having a length and width, and the base extending from and providing added thickness to the arcuate portion of the saddle body adjacent the saddle opening;
the housing having a length and width that are less than the length and width of the base, respectively;
the rotatable valve housed in a valve cavity within the housing of the corporation stop body comprising a valve element further comprising a bore that extends through the valve element and is perpendicular to an axis of rotation of the valve element, wherein the bore through the valve element is located between and axially aligned with the saddle opening and the outlet when the valve element is in a fully open position, and when the valve element is rotated one quarter turn to a closed position the valve element occupies the same axial position as when in the fully open position but prevents fluid flow between the saddle opening and the outlet;
wherein the rotatable position of the valve element controls fluid flow between the saddle opening and the outlet; and
securing the water main tapping device to a saddle back portion about the water main;
ensuring the rotational position of the valve element is in the fully open position;
inserting the drill through the outlet, the valve element bore, and the saddle opening to strike the water main;
drilling into the water main;
removing the drill from the water main tapping device; and
rotating the valve element to the closed position.

12. The method of tapping a water main of claim 11, wherein a surface of the corporation stop body near the outlet is threaded.

13. The method of tapping a water main of claim 11, wherein the integrally formed single piece corporation stop body and saddle body comprise metal.

14. The method of tapping water main claim 13, wherein the metal further comprises stainless steel.

15. The method of tapping a water main of claim 11, wherein securing the water main tapping device to a saddle back portion further comprises connecting the first and second ends of the arcuate portion of the saddle body to first and second ends of the saddle back portion.

16. The method of tapping a water main of claim 15, wherein the ends of the saddle back portion are connected to the ends of the saddle body by fasteners.

17. The method of tapping a water main of claim 11, wherein the base is circular.

18. The method of tapping a water main of claim 11, wherein the integrally formed saddle body and corporation stop body have a height that is no more than three times a largest radial dimension of the valve element.

19. The method of tapping a water main of claim 11, wherein the valve element comprises a ball or plug valve.

* * * * *